J. P. Manny.
Mower.
№ 34761                    Patented Mar. 25, 1862.
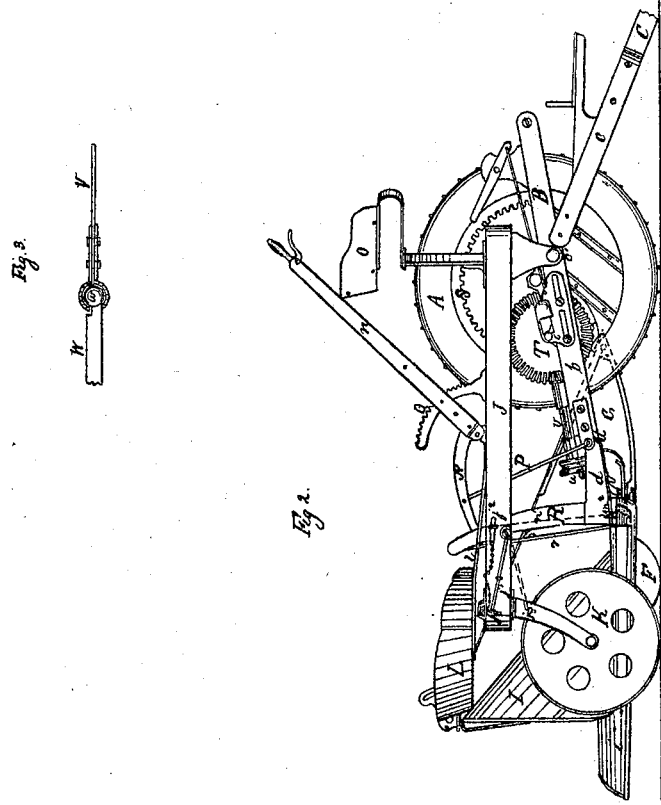
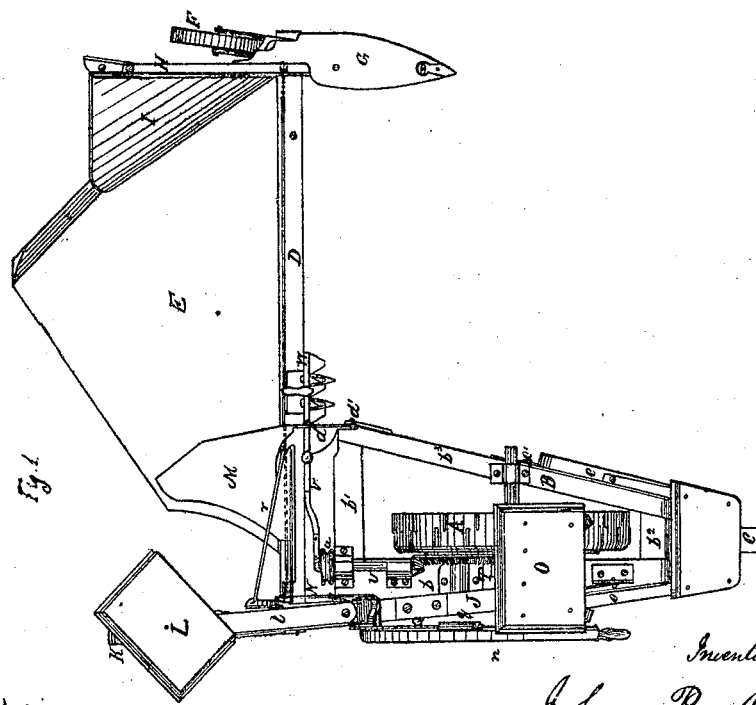
Witnesses
Wm. D. Baldwin
J. Snowden Bell
Inventor
John P. Manny

UNITED STATES PATENT OFFICE.

JOHN P. MANNY, OF ROCKFORD, ILLINOIS.

IMPROVEMENT IN HARVESTERS.

Specification forming part of Letters Patent No. 34,761, dated March 25, 1862.

*To all whom it may concern:*

Be it known that I, JOHN P. MANNY, of Rockford, in the county of Winnebago and State of Illinois, have invented certain new and useful Improvements in Harvesters, of which the following is a full, clear, and exact description, reference being had to the accompanying drawings, which make part of this specification, and in which—

Figure 1 represents a plan or top view of a harvesting-machine embracing my improvements. Fig. 2 represents a view in elevation of the gearing side of the same; and Fig. 3 represents a view on an enlarged scale, partly in section and partly in elevation, of a portion of the cutter-bar and pitman, showing the manner in which they are connected.

The first branch of the invention claimed under this patent relates to an improved mode of constructing and connecting the gearing-frame and tongue; and my improvement consists in constructing the gearing-frame with converging sides, (so that it shall be wider in rear than in front, and entirely surround the driving-wheel,) and connecting it with the tongue by means of hounds rigidly secured to the tongue and hinged near the axle of the driving-wheel, whereby I secure a strong rigid frame, free from any tendency to warp and twist, and attain many advantages in the arrangement of the line of draft, as hereinafter described.

The second branch of my invention relates to a device for preserving the horizontality of the finger-beam while raising and lowering it; and my improvement for effecting this object consists in hinging the finger-beam and gearing-frame together and suspending them from a rigid independent frame or beam by means of both a flexible and a rigid connection, as hereinafter described, whereby the machine may be raised or lowered and retained in any desired position, and yet retain the finger-beam always parallel to the surface of the ground.

The third branch of my invention relates to an improved method of preventing side draft and any lateral movement of the machine when working on the side of a hill; and my improvement for effecting this object consists in a device for locking the caster-wheel at such angle as may be necessary to produce this result, as hereinafter described.

The accompanying drawings represent a convenient arrangement of parts for carrying out the objects of my invention, in which the driving-wheel A is shown as turning in bearings in a stout rigid frame, B, which also supports all the driving-gear. This frame consists of two strong longitudinal beams, $b\ b^3$, arranged side by side, gradually converging, and united by two cross-bars, $b'\ b^2$, so that it is wider in rear than in front.

The tongue C is rigidly secured to the hounds $c$, which diverge sufficiently to correspond in shape with the gear-frame, to which they are hinged, near the axis of the driving-wheel, by the joints $c'$, which allow the tongue to play freely vertically but not laterally.

The finger-beam D is connected to the rear end of the gearing-frame B by means of the lugs or ears $d$ and hinges $d'$. The platform E, together with the frame which sustains it, is secured to the finger-beam in such manner that it may readily be detached therefrom, in order to adapt the machine to mowing. This platform I prefer to make of the shape shown in Fig. 1 of the drawings, and with its inner edge cut away, so as to leave a space in which the caster-wheel K may turn. The outer end of the finger-beam is upheld by a caster-wheel, F, and provided with a suitable divider, G, and reel-standard H, to which latter an inclined wing-board, I, may be hinged, in order to deflect the grain toward the gearing side of the machine.

One end of a stout horizontal beam or frame, J, is hinged to the gearing-frame B near the axle of the driving-wheel A, (in such manner as to allow it to play freely vertically, but not laterally,) while its other end is supported by a caster-wheel, K. Upon one side of the frame which carries the caster-wheel is a staple, $j$, in which a hook, $j'$, upon the beam J engages when it is required to lock the caster-wheel to prevent its stem or spindle from turning in its bearing. The same result may be obtained by making the stem of the caster polygonal or rectangular in shape and inserting a pin, $j^2$, into a slot or opening, $j^3$, above the beam. Both of the above-mentioned methods are exemplified in red lines in Fig. 2.

A seat or position, L, for the raker is mounted upon the frame J, just above the caster-wheel K, and rests on a spring, $l$, to which it is pivoted in such manner as to allow it a free hori zontal turning movement. I have in my experiments sometimes located the raker's stand directly upon the finger-beam itself, in which position the weight of the raker would still ultimately be supported by the beam J; but I prefer mounting it upon the frame J itself, as above mentioned.

The finger-beam is raised and lowered to cut at different heights in the following manner: A bent lever, N, is pivoted upon the horizontal frame J, its handle $n$ extending forward to the driver's seat O, which is also mounted upon this frame. A rod, P, extends from the joint $d'$ between the finger-beam and gearing-frame to the middle of the bent lever N. This rod sometimes pulls and sometimes pushes upon the joint, but always keeps the joint and lever at the same relative distance apart. A cord or chain, $n'$, extends from the rear end of this bent lever down to a pulley, $n^2$, on the finger-beam, and thence along the beam to another pulley in the rear end of the divider, and is fastened to the hinder end of the hinged arm which supports the caster-wheel F. By this means both ends of the beam may be raised or lowered simultaneously. The relative sweep of the arcs described by the points on the bent lever at which the rigid and the flexible connections are formed is such as always to preserve the finger-beam horizontal. The beam is held in any desired position vertically by means of a curved rack, Q, into which a spring-detent, $q$, takes, while its horizontality is maintained (in connection with the cord $n'$ and rod P) by means of a curved post or standard, R, rigidly secured to the finger-beam and sliding freely endwise in a slot or clamp on the horizontal frame J. This post may be stiffened by a brace-rod, $r$, extending from the finger-beam to the top of the post.

The driving-gear consists in this instance of an annular internal spur-wheel, S, bolted to the face of the driving-wheel. A spur-pinion on the counter-shaft $t$ gears into this spur-wheel. A bevel-wheel, T, upon this counter-shaft drives a crank-shaft, U, carrying a pulley, $u$, upon its hinder end. Upon this pulley is a wrist-pin, to which the pitman V is connected by means of a ball-and-socket joint. The other end of the pitman is connected to the end of the cutter-bar W by a similar joint, $w$, as shown in Fig. 3. The large bearing-surface thus obtained I have found of great advantage in the practical working of the machine, as it renders the couplings much more durable.

The machine is to be provided with a reel, and also with a suitable cutting apparatus; but I do not deem it necessary to describe in detail these and other parts of the machine, their construction and mode of operation being well known to all skillful manufacturers of reapers. Moreover, they form no part of the subject-matter herein claimed.

The operation of the machine is such that as it progresses the pull of the team (owing to the arrangement of the joints of the tongue relative to the axle of the driving-wheel) comes upon the gearing-frame in such manner as to leave the finger-beam free to conform to the undulations of the ground, which is of great importance, especially in mowing.

It is true that a gearing-frame has been used which terminated at the axle of the driving-wheels, to which axle the tongue was hinged; but this plan does not afford the requisite stiffness to the frame, and I have, in common with others, been compelled to abandon it. A converging gear-frame has likewise been used in combination with a rigid tongue; but such arrangement destroys the flexibility of the finger-beams, and the pull of the team tends to elevate the finger-beam in moving. Besides, were the driving-wheel of such a machine to drop into a furrow, the greater portion of the weight of the machine would be thrown upon the necks of the horses and upon the finger-beam, thus raising the driving-wheel from the ground and stopping the gearing and cutters.

The advantages of the horizontal frame are that it enables me to sustain the weight of the finger-beam, to diminish the side draft, and to relieve the tongue entirely from the weight of the machine, besides affording a support for the driver and for the raker.

The locking of the stem or spindle of the caster-wheel prevents the tendency of the machine to slide laterally when cutting on hillsides with the divider side of the machine uppermost, and thus enables me to cut a wider swath than could be done without it.

By releasing the spring-detent $q$ from its rack the finger-beam would be left free to play up and down to conform to the undulations of the ground, which is a feature of great importance, especially in mowing, where it is required to cut very close, and as the finger-beam is always kept horizontal, there is no danger of the points of the guards digging into the ground.

What I claim under this patent as my invention, and desire to secure by Letters Patent, is—

1. The combination of the converging gear-frame B with the hinged diverging hounds $c$ and rigid tongue C, when arranged and operating substantially in the manner and for the purposes described.

2. The combination and connection of the gearing-frame and finger-beam with the horizontal frame J by means of both a flexible and a rigid connection, substantially as described, for the purpose of keeping the finger-beam horizontal in every position, as set forth.

3. Locking the caster-wheel K for the purpose of preventing lateral motion of the machine when working on hillsides, substantially in the manner described.

In testimony whereof I have hereunto subscribed my name.

JOHN P. MANNY.

Witnesses:
WM. D. BALDWIN,
JOHN S. HOLLINGSHEAD.